United States Patent
Vemuri

(10) Patent No.: US 8,660,967 B2
(45) Date of Patent: Feb. 25, 2014

(54) SYSTEM AND PROCESS TO AUTOMATE A JOB SEEKER'S PROFILE AND JOB APPLICATION

(76) Inventor: Sreegopal Vemuri, North Brunswick, NJ (US)

( * ) Notice: Subject to any disclaimer, the term of this patent is extended or adjusted under 35 U.S.C. 154(b) by 347 days.

(21) Appl. No.: 13/029,886

(22) Filed: Feb. 17, 2011

(65) Prior Publication Data

US 2011/0209068 A1    Aug. 25, 2011

Related U.S. Application Data

(60) Provisional application No. 61/305,441, filed on Feb. 17, 2010.

(51) Int. Cl.
*G06Q 10/00* (2012.01)
(52) U.S. Cl.
USPC .......................................... 705/321; 705/320
(58) Field of Classification Search
USPC ................................. 705/320–321
See application file for complete search history.

(56) References Cited

U.S. PATENT DOCUMENTS

| | | | | |
|---|---|---|---|---|
| 7,711,573 | B1 * | 5/2010 | Obeid | 705/321 |
| 8,165,967 | B2 * | 4/2012 | Gomez et al. | 705/321 |
| 2006/0229899 | A1 * | 10/2006 | Hyder et al. | 705/1 |
| 2007/0033186 | A1 * | 2/2007 | Cinkle | 707/6 |

* cited by examiner

*Primary Examiner* — Tsan-Yu J Huang

(57) ABSTRACT

A software application tool to assist users for an efficient job searching process. The present invention provides a number of tools that helps the user organize all of their job application documents, keep track of tasks that need to be done, keep track of all of their job application progresses, make goals, and associate documents to each job application. The users are provided the means to access a plurality of job sites through the present invention. This prevents the need for the users to log onto a large variety of job sites. The organization tools and the accessibility to different jobsite provide the users with a much more efficient job application process for more time to upgrade their own skills and expand their network.

8 Claims, 17 Drawing Sheets

| Dashboard | Applications | Tasks | Documents | Invite Friends | Message Center | Reports | Rss | Settings |

Application
Keep an eye on the jobs you have applied for. Edit applications; add tasks or documents to them. Track your progress on the job application with adding notes.

124

Job Detail  [Submit] [cancel]

124a

| Job Title | Company | Job Id | Salary |
| Sr. Core Java Develop | encora | Java-1 | Open |

| Posting Date | Apply Date | Location | State |
| 1-3-2011 | 1/31/2011 | Seattle, WA | |

| Source | Interest Level | Status |
| Seeker. Dice.com | ○ LOW  ○ MEDIUM  ○ HIGH | ☐☐☐☐☐ |

Job Description

Hi, We have a position with one of our Direct Client. If you are interested and available please send me your updated resume, so that we can discuss more about this position. Role: Sr. Core Java DeveloperLocation: Seattle,
WADuration: 6+ MonthsRate: OpenRequired Skills:Core JavaBatisJ2EESpringHibernateOracleSQL ServerDesign PatternsExcellent Communication SkillClient Facing Eperiennce Communication SkillClient Facing experienceThanks, Milan Agarwal, Encora, Inc. Pittsburgh, PA-15220412-561-2654Fax: 412-561-0808Email:

Contact Details  [Submit] [Cancel]

| Contact Name | Contact Phone Number | Email |
| | | |

Document Detail

No documents available
⊕ ADD RESUME
⊕ ADD COVERLETTER
⊕ ADD DOCUMENT

124b

Tasks

No tasks yet
⊕ ADD TASKS

124c

Notes

No notes yet
⊕ ADD NOTES

| Dashboard | Applications | Tasks | Documents | Invite Friends | Message Center | Reports | Rss | Settings |

Reports
Track Progress using Jobpad reports and tune your job search strategy.

You & Your Peers
Total by Status
Details

Tasks
Average Task Time
Details

Goals
Average Goal Time
Details

Top Popular Companies
10 Top Companies
Details

Top Job Titles
10 Top Job Titles
Details

Top Locations
10 Top Locations
Details

Efficiency
Efficiency by Source & Resumes

○○○○○ See Prices and Plans
Free till April 1st, 2011

Job Pad
Take a tour

Home | About Us | Tools | Supported Sites | Terms and Conditions | Privacy Policy | Feedback    JOBPAD

FIG. 13

SYSTEM AND PROCESS TO AUTOMATE A JOB SEEKER'S PROFILE AND JOB APPLICATION

The current application claims a priority to the U.S. Provisional Patent application Ser. No. 61/305,441 filed on Feb. 17, 2010.

FIELD OF THE INVENTION

The present invention relates generally to software applications, more particularly to a method and system for efficient tracking and managing of job searching tasks.

BACKGROUND OF THE INVENTION

In today's competitive job market, even the most experienced and organized jobseeker has struggles to manage the details of a typical job search. This may include applying for jobs in multiple job sites, keeping track of submitted applications, and managing multiple resumes, all of which leave the jobseeker with many papers, spread sheets, Post-it notes, and hours of data entry work. Keeping track of multiple submitted applications over an abundance of different job searching sites or even corporate sites can often lead to lost or forgotten details. Such details include simple tasks such as remember a specific job that has been applied to or the user name and password to a specific job site. Additionally, with many different job applications, job seekers tend to modify their resumes for each specific position. It is important for job seekers to associate specific resumes and cover letters to the correct job opening. It is the primary objective of the present invention to provide a jobseeker with an innovative job search organizer tracks and manages job searching tasks. In addition, this invention reduces total time needed to submit a job application significantly. Instead of individually copying the job posting details, the present invention provides a tool that is able to parse and automatically collect data from the job posting site directly for organization and book keeping. This additional time saved can be used by the user to upgrade their skills and network with other people.

SUMMARY OF THE INVENTION

Accordingly, the present invention provides a job search organizer software. The software provide a jobseeker with a tool to track job applications, associate documents such as resumes, cover letters, and thank you letters with particular job applications, and manage tasks. The present invention will retrieve job applications from popular job searching websites such as Monster, HotJobs, and Dice as well as provide the user with the ability to make lists of tasks that need to be accomplished. This may include sending follow-up emails, calling a recruiter, or keeping track of interviews.

In addition, the present invention provides a location for a jobseeker to store all job searching related documents in one place which may comprise of telephone scripts, company research, interview preparation notes, and marketing letters. The present invention will also allow the user to set goals during the job search process to keep the jobseeker motivated. If any significant events occur during a job search, the user will be able to keep a record of it in a job log. The present invention will also aggregate job listings from job search engines through the addition of RSS feeds.

The present invention can be applied in many different interfaces including, but should not be limited to, desktop application, mobile application, smart phone application, and widgets that can be embedded into other websites such as Google or Yahoo.

BRIEF DESCRIPTION OF THE DRAWINGS

FIG. 2 is a view of the application management interface and the organization application programming interface system where a simplified version of the job application tracker, the task list, and the goals manager is shown.

Figure 4:
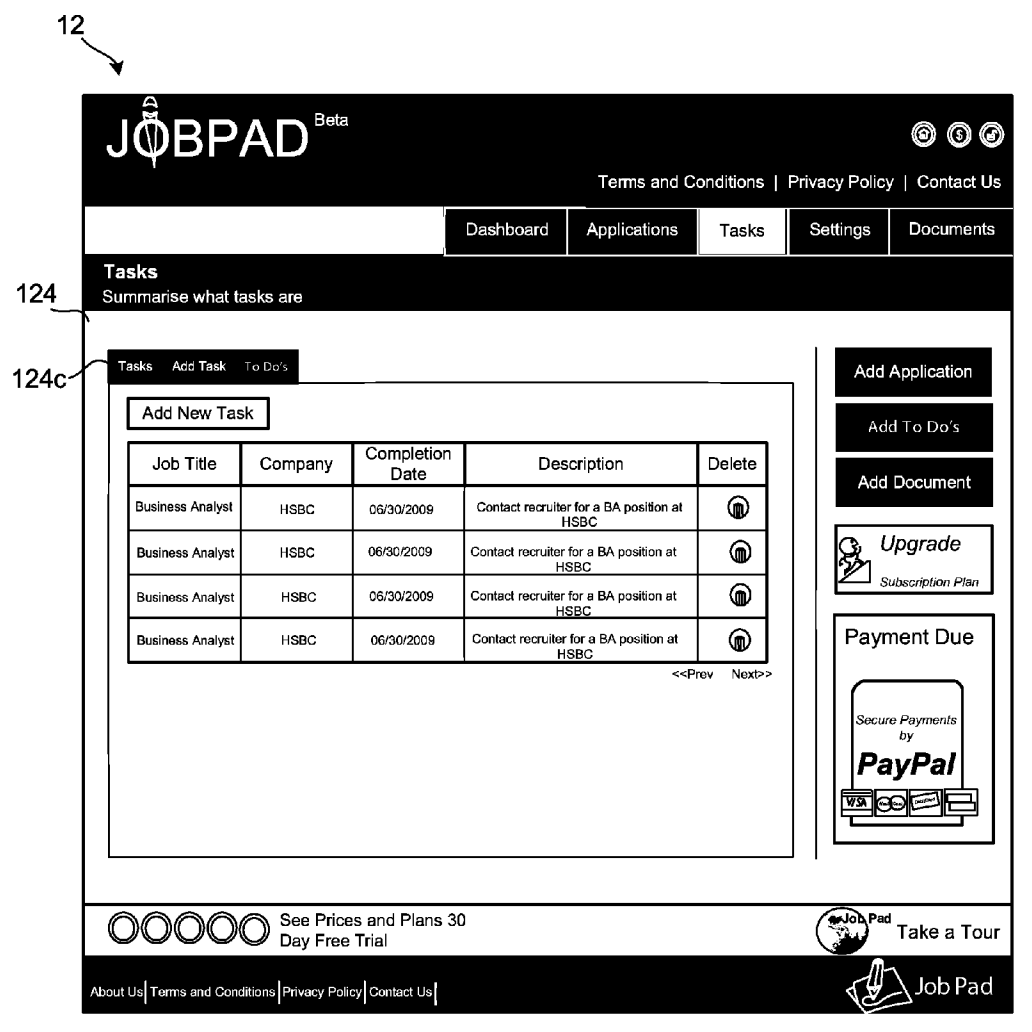

FIG. 4 is a view of the detailed tasks list. The users can see which tasks they have to perform for the corresponding job application. The user can also choose to add more tasks that need to be performed.

FIG. 6 is a detailed view of a submitted job application and the job application log accessed through the job application tracker. The user is able to edit the information of the job application here. The associated documents and tasks for the specific job application are also shown.

FIG. 7 is a view of the job posting list. The user is able to use RSS feeds to view recent job postings from the plurality of job sites.

FIG. 10 is a view of a jobsite. The user is able to log in to the jobsite by means of the main credentials provided by the job application management system.

FIG. 13 is a view of the reports system. The user can access the reports system to compare their progress with their peers, see the statistics on their task or goal completion efficiency, and see their efficiency depending on job sources and resumes. The reports page also provides reports on top popular companies, job titles, and job locations.

DETAIL DESCRIPTIONS OF THE INVENTION

Figure 1:
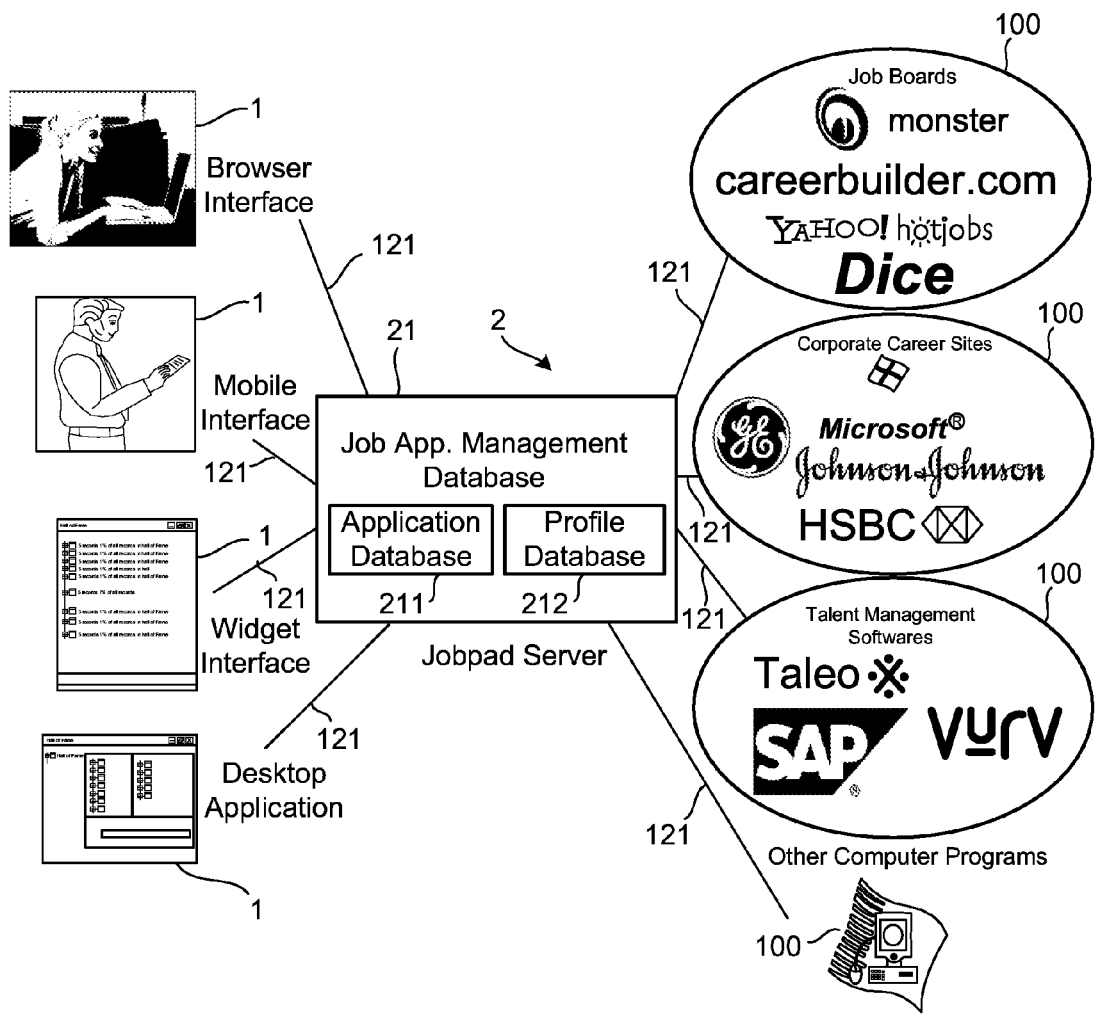
FIG. 1 is a diagram illustrating the method of operations associated with utilization of the present invention. The users are able to access the present invention through a number of different device interfaces. Through the present invention they are able to manage all of their job applications for the plurality of jobsites.

All illustrations of the drawings are for the purpose of describing selected versions of the present invention and are not intended to limit the scope of the present invention.

The present invention is an application system that provides job seekers convenient and usefully management capabilities to organize and manage job applications and associated documents. These associated documents can be customized resumes, cover letters, to-do lists, logs, and all other documents related to each specific job application. The user will be able to register an account with the present invention and log-on by means of a number of different interfaces available. These interfaces can be desktop computer applications, a mobile handheld application, a browser web based application, and widget applications. The desktop computer application can be dedicated applications that can be installed onto the user's computer. The mobile handheld application is a simplified version of the desktop computer application for handheld devices such as cell phones, network accessible tablets or mp3 players, and PDA's. The browser web based application is an application user is able to access by means of a web browser. The widget application can be embedded applications on websites for ease of access for the user. In reference to FIG. 1, the job application management system 1 will operate on a job application management server 2. The job application management system comprises a welcome page 11, an application management interface 12, and a profile management interface 13. The job application management server has a job application management database 21 that further comprises of an application database 211 and a profile database 212. The application database stores all of the information regarding a user's job application data and documentation. The profile database stores all the personal and professional history information of the job seeking user.

Figure 12:
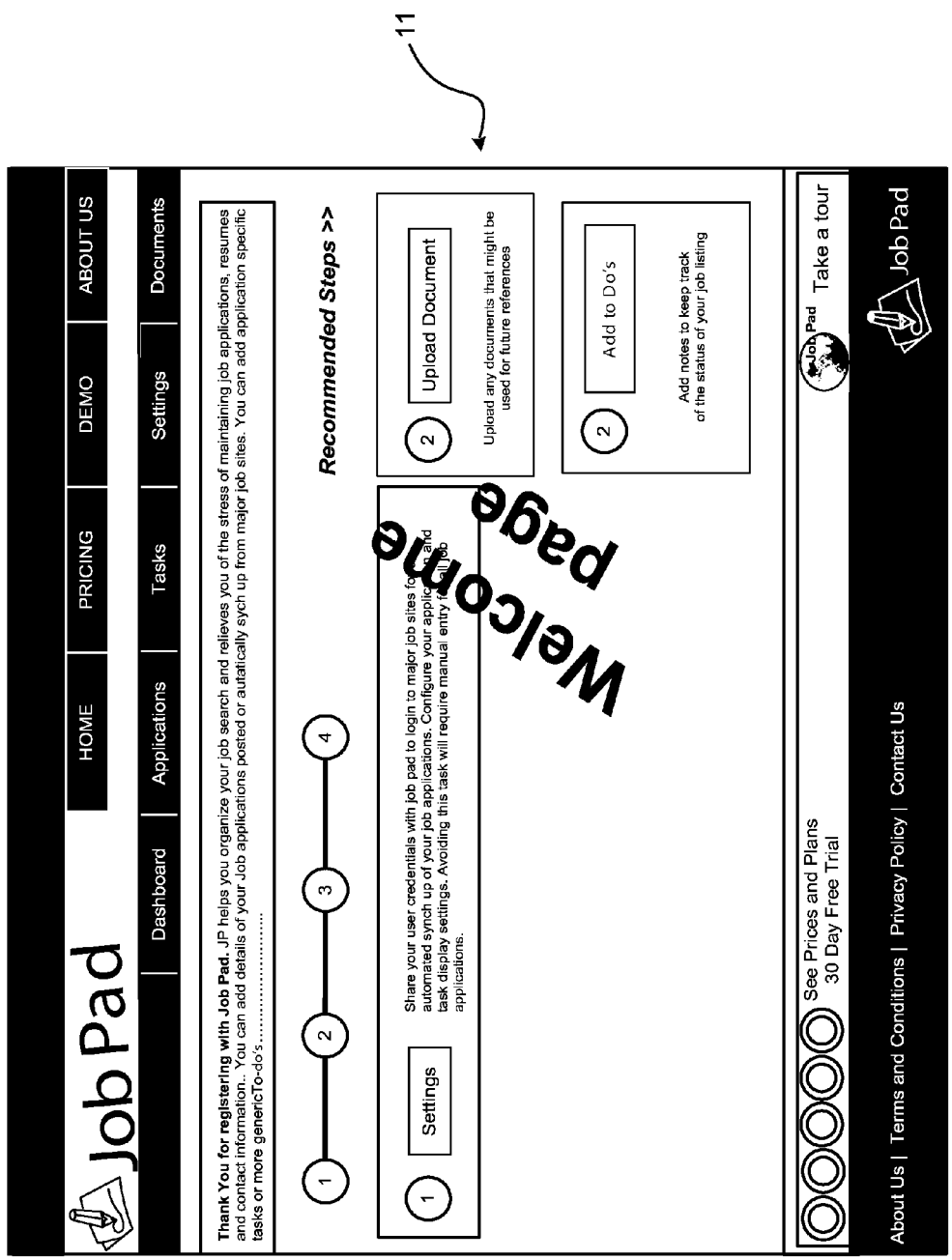
FIG. 12 is a view of the welcome page. The users have the option to provide all of their available credentials to access the plurality of jobsites for the present invention, upload all of their job search related documents, and add tasks to do.

In reference to FIG. 12, the welcome page allows first time users to register and provide their credentials to a plurality of job sites 100. The use will then be provided main credentials for accessing the job application management system. The plurality of job sites is all of the different types of job searching agent websites that provide job postings by different companies. The present invention provides job seekers with a single website where job seekers can access all of the plurality of job sites. The welcome page provides uploading means of profile documentation to be stored into the profile database. The credentials that the users provide for the plurality of job sites grants the job application management system to access the plurality of job sites. By granting access to the plurality of job sites, the welcome page allows the first time users to combine their entire job seeking resources into a single application interface for easy and organized management. The combination of the job seeking resources into a single application allows the users to spend less time in dealing with so many types of websites and have more time in upgrading their skills and improving their chances of landing a job.

Figure 7:
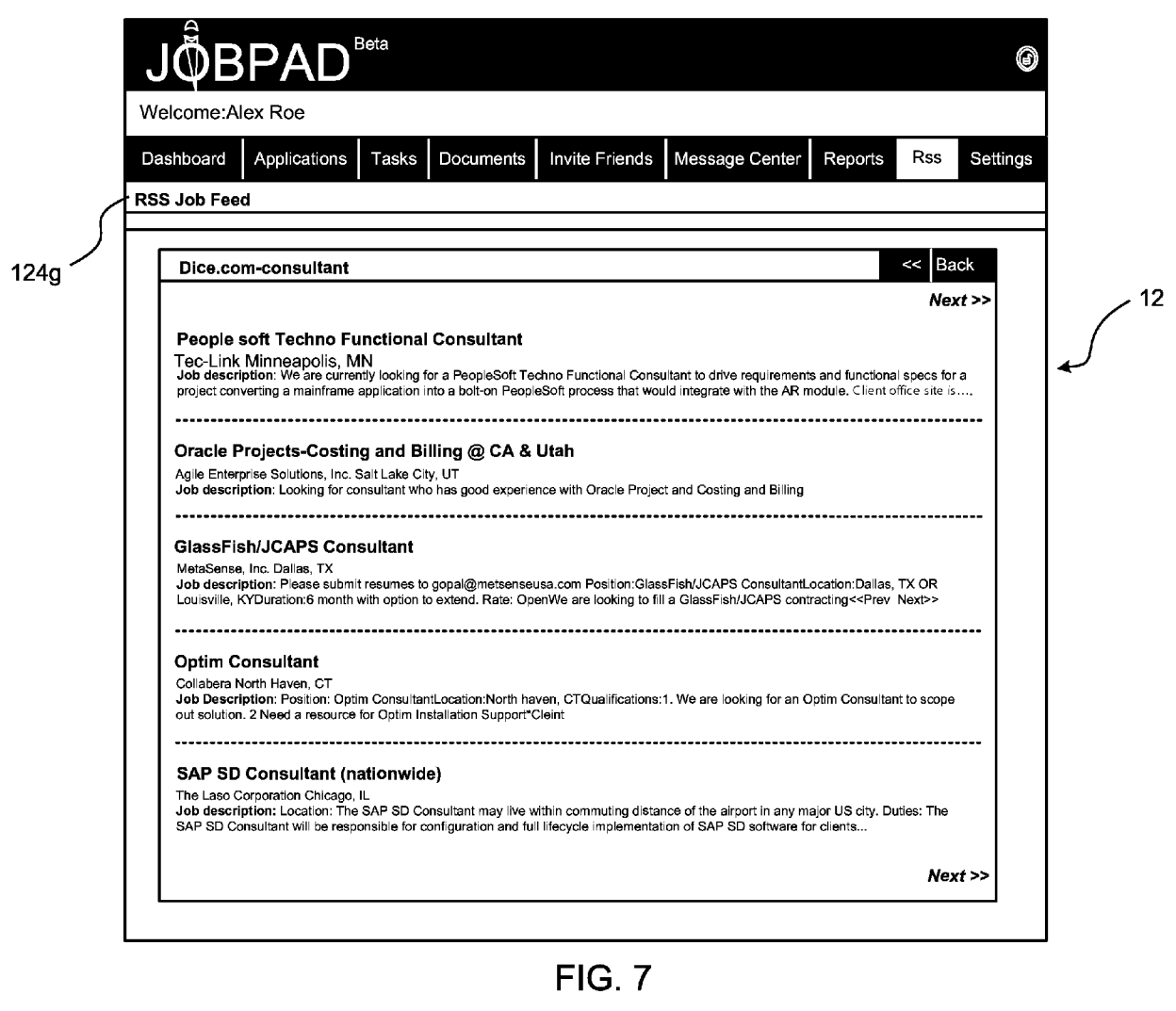
Figure 8:
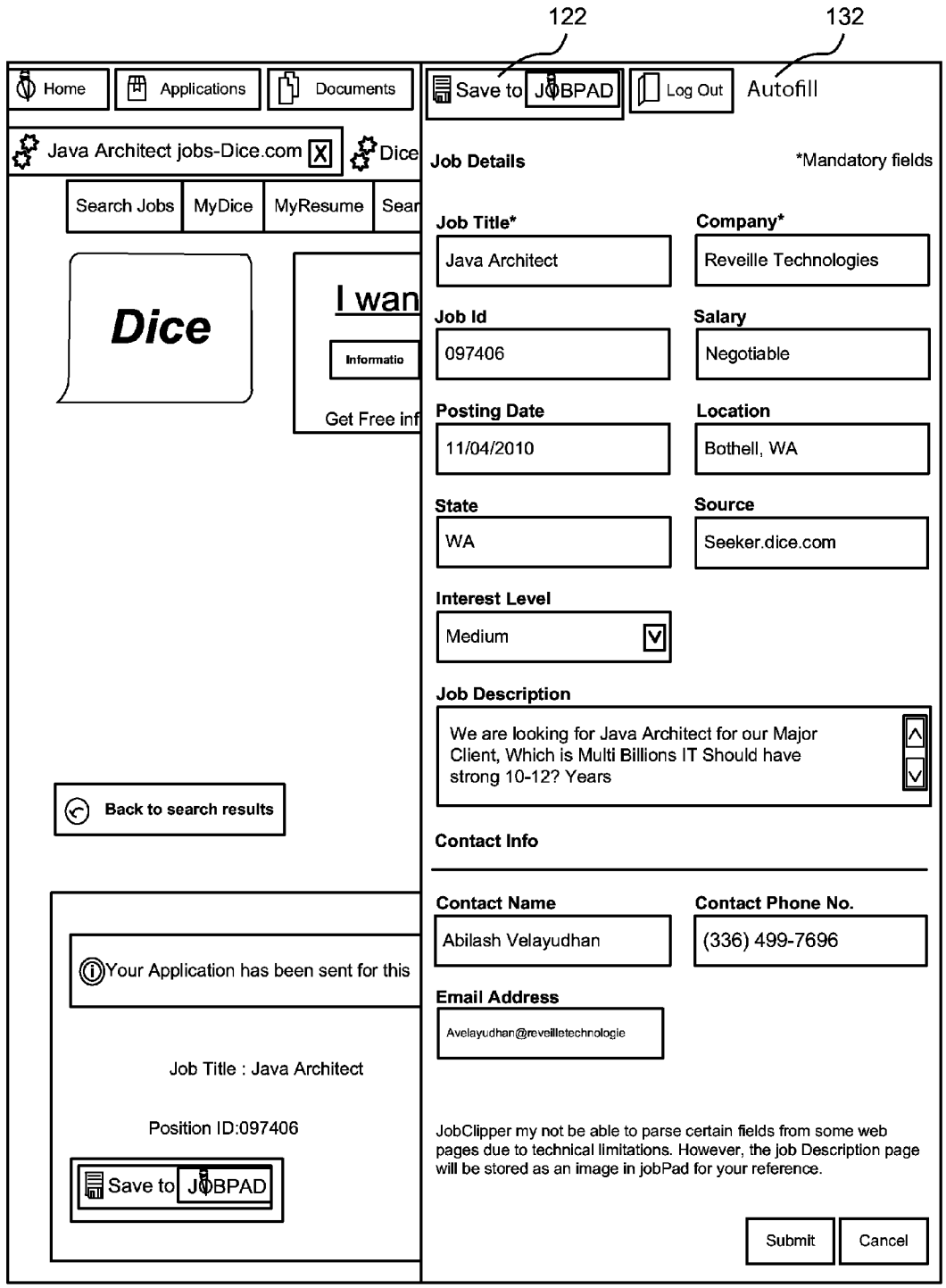
FIG. 8 is a view of the application browser extension system and the profile browser extension system. The user is able to extract information from a job application on any job site by means of the application browser extension system.
Figure 9:
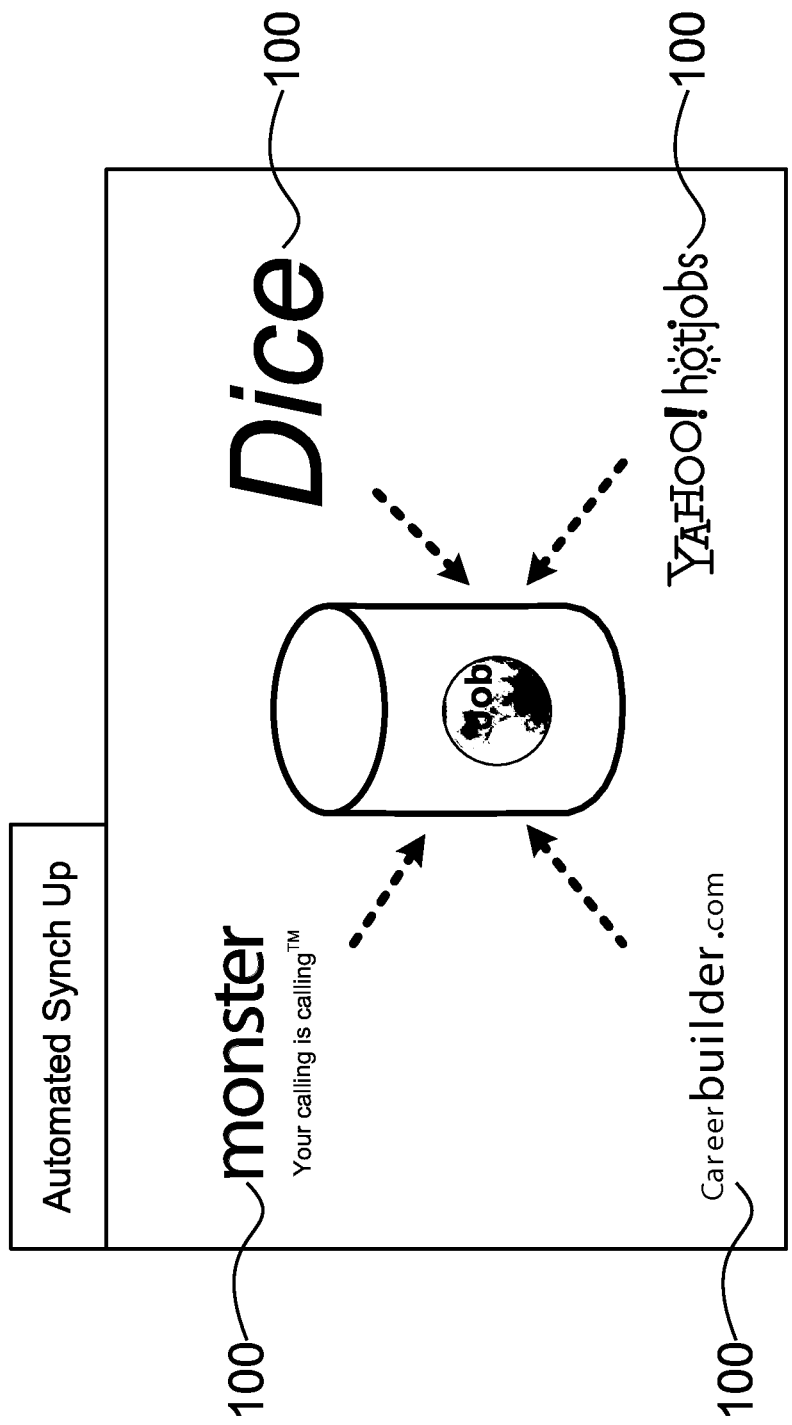
FIG. 9 is a view of the synchronization of the user's submitted job applications from the plurality of job sites to the present invention's job application management database.

In reference to FIG. 2-7, the application management interface comprises of a HTTP interface system 121, an application browser extension system 122, a message system 123, a reports system 125, and an organization application programming interface system 124. The HTTP interface system communicates and retrieves all the job application information to and from the plurality of job sites. The application browser extension system provides the user with convenient access to the job application management system for synchronization with the plurality of job sites, as shown in FIG. 9. The primary purpose of the application browser extension is to automatically capture submitted job application. This system keeps track of job submission process using proprietary algorithm. First it identifies when user lands on a job description page, then it captures and stores that job description page within the application cache for future use. Then it follows job submission process which may include several steps such as uploading resume, answering job specific questions etc. Then after successful submission, the application browser extension provided by the present invention recognizes that job seeker completed job submission process, as shown in FIG. 8. Then application browser extension provides job seeker an option to save submitted job application into database. Once user clicks on that "save" option, application browser extension provides parses job description page and captures details such as job title, company name, salary etc. These details will be presented to the user. These details can be modified by the jobseeker as needed. Once user submits the data, application browser extension sends job details to application management interface. In addition, application browser extension sends job Description page URL and image of the job description page. The URL is used by the job seeker to refer to the original job listing from the source. The image will be used by the job seeker even if original URL is expired or not relevant to the original job listing. In addition to these, application browser extension will analyze job related emails from any email client such as gmail, yahoo mail and Microsoft Outlook and update job specific information. Application browser extension provides the means to autofill job seeker profile during job application submission process. The application browser extension will capture job seeker profile(s) automatically and save them in the profile database. In reference to FIG. 13, the reports system provides the users with means to track the statistics of their job searching endeavors. The statistics reports include how the user is doing in their job search compared to their peers. The users are able to see the number of job openings they have applied to, the number of times they have followed up with a job opening, the number of responses they have received, the number of times they have been interviewed, negotiated and closed a job application process. The same statistics are shown for the user's peers as comparison. The report system also provides means the user with statistical reports on their task completion efficiency. The task completion efficiency is shown by providing the application names, the task names for the specific application, the date of task creation, the due date for the task, the completion date, duration and the average time. These statistics help the user understand where they need to improve upon to maximize their efficiency in the job searching process. Similar to the tasks statistics, the reports system also provides the statistics reports on the user's goal completion efficiency. Additionally, the reports system provides the user with information about their efficiency based on source and resumes they have been using. The other information that the reports page provides the user includes top job locations, top job titles, and top popular companies. The message system provides the user with management capabilities of emails relating to job application. The organization application programming interface system provides the user with full management of job application information.

In reference to FIG. 1, the HTTP interface system is able to communicate and retrieve job application information to and from the plurality of job sites by means of web service calls. The web services calls are HTTP requests to interact with each of the plurality of job sites using the provided credentials from the welcome page. The HTTP interface system is able to login to the plurality of job sites with the provided credentials. By entering each of the plurality of job sites, the HTTP interface system is able to access all the information about the user's previous and current job applications in progress. The HTTP interface system will then retrieves the information using the web services from the plurality of job sites in XML or any other required format to be stored into the application database. The web services and technologies include PHP, java and XML to extract and retrieve job application data corresponding with each of the job sites of the plurality of jobs sites.

Figure 16:
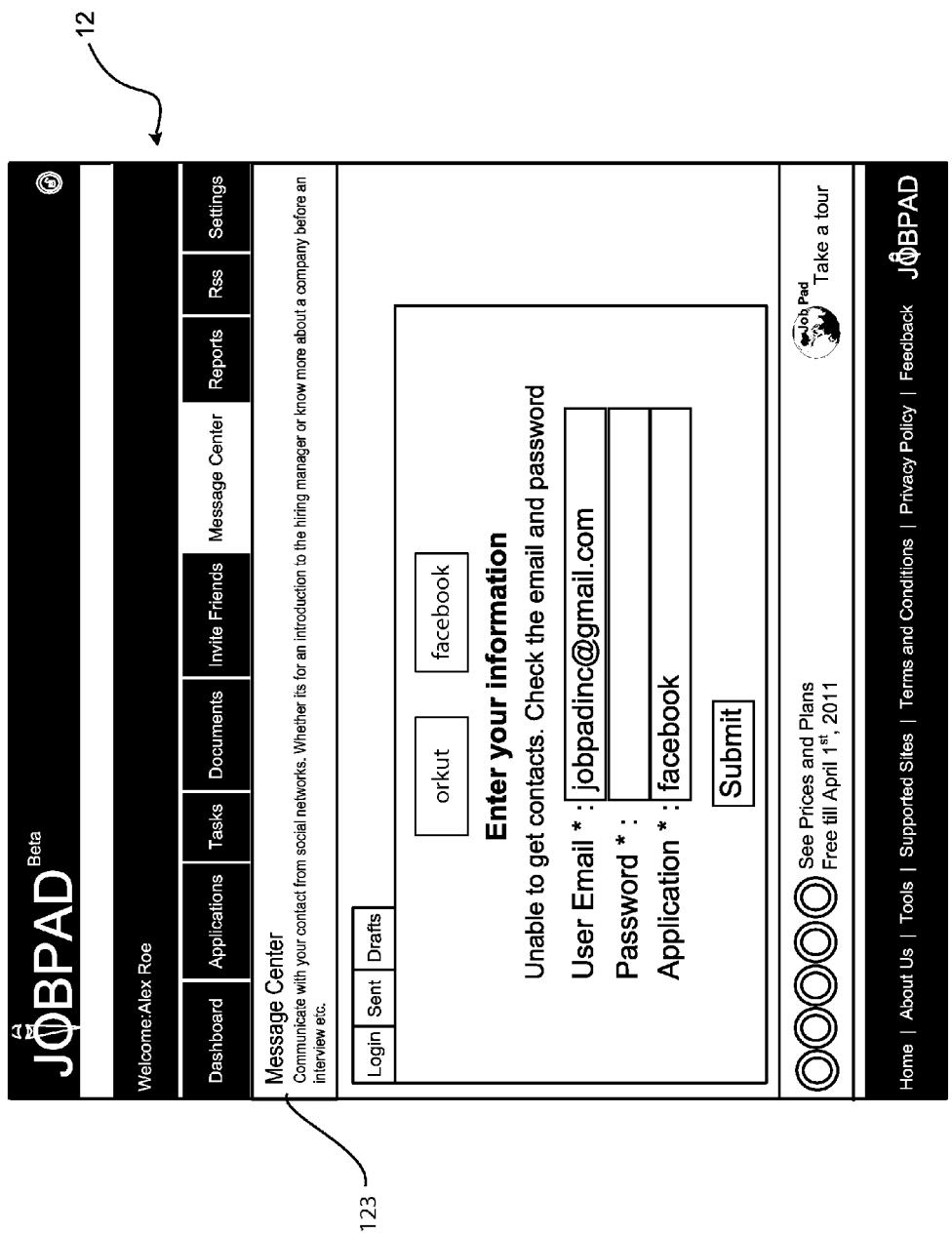
FIG. 16 is another view of the message system, where the user is able to track their sent messages that relate their job searching process.
Figure 17:
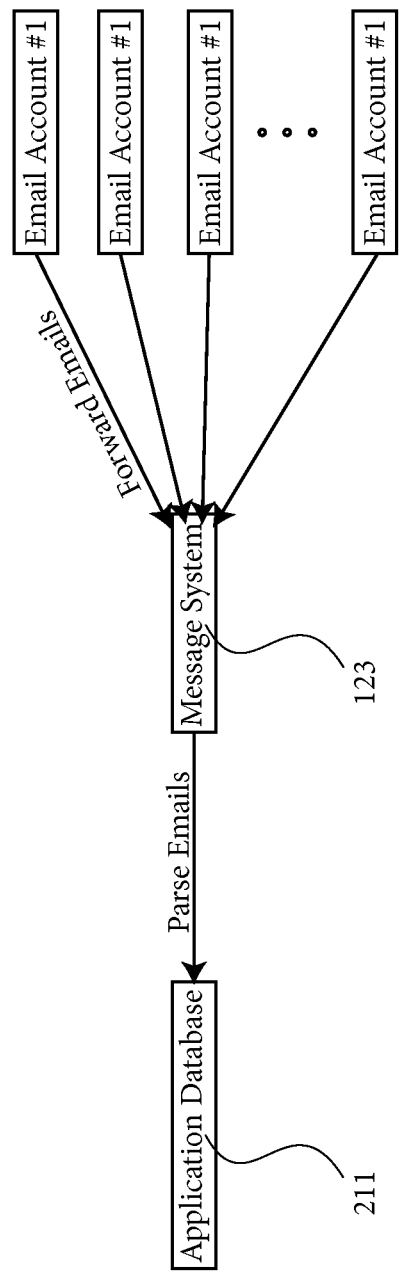
FIG. 17 is a flow chart of the message system where users can forward emails from multiple email accounts to the message system. The message system is able to parse all of the emails and store only job related emails into the application database.

In reference to FIG. 8, the application browser extension system is integrated with a user's web browser to provide the user easy access to the job application management system. More specifically, the application browser extension system provides the user with easy access to the stored documentation in the profile database when they are applying for jobs. When the user is on a job application website that is not directly linked to the job application management system, the application browser extension system is able to parse the unknown job application website and extract the job application details. The extracted job application details are then stored into the application database of the job application management system for later review or notifications. The extracted job application details are transmitted to the application database by means of a network connection transfer. This includes details such as job description page URL and image of the job description page In reference to FIG. 15-17, the message system provides job seeking users with a mailbox that can receive forwarded emails relating to job applications into the job application management system. The message system is able to store the job application related emails into the application database. After storing the job application related emails, the message system is able parse through the job application related emails for job application details. These parsed job application details are then extracted and stored into the application database to log the events that occurred for the specific job application.

Figure 2:
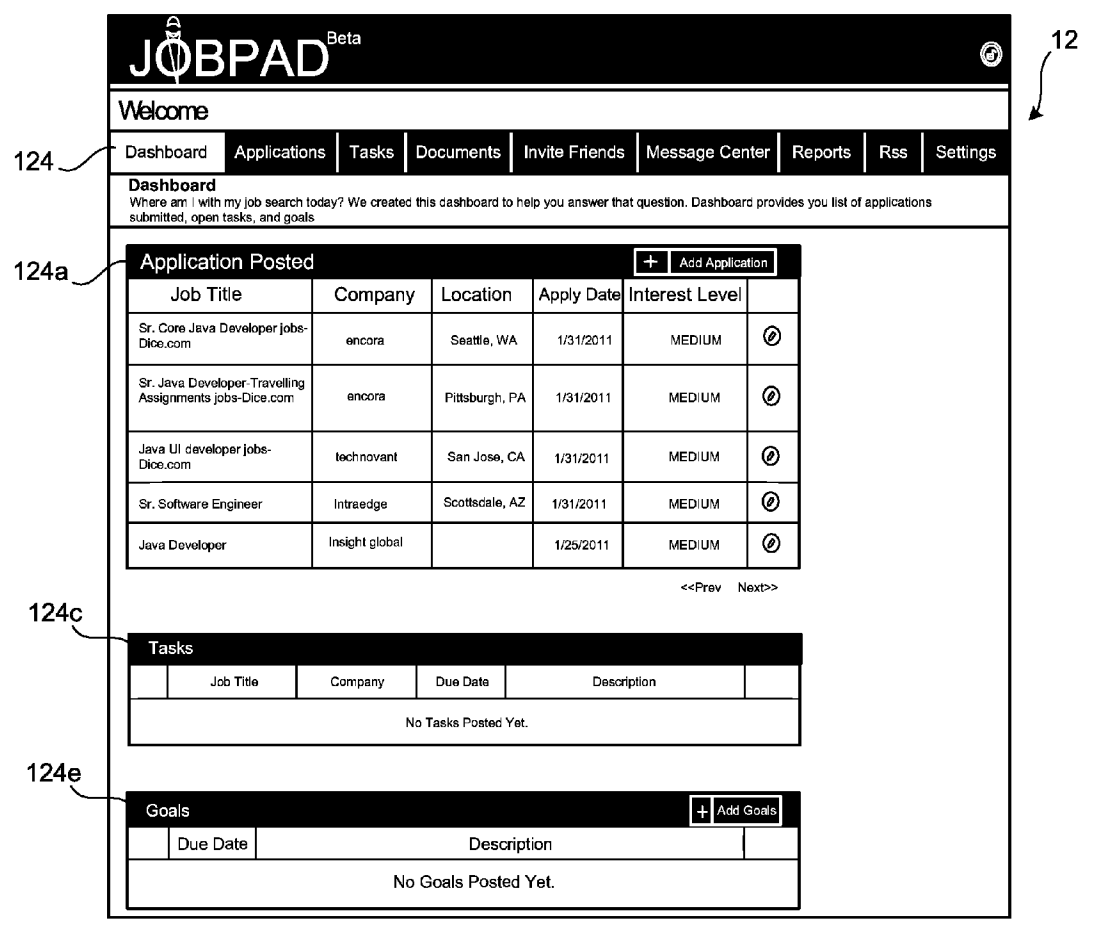
Figure 3:
FIG. 3 is a view of the job application tracker where the user can see the status of each job application submitted. The user can further see the details of the job application by clicking on each job application individually.
Figure 5:
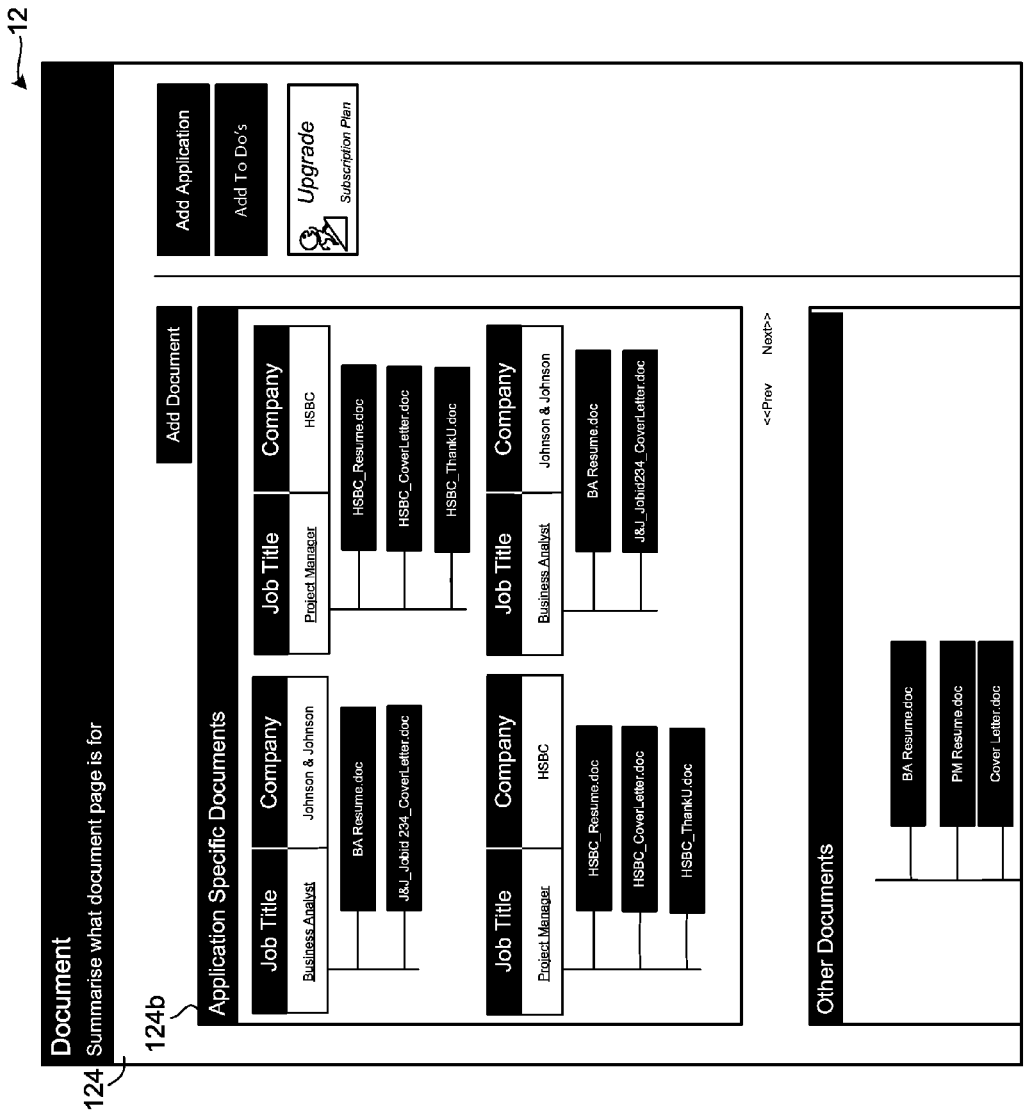
FIG. 5 is a view the document association tracker. The user can see which documents were utilized for each of their submitted job applications.
Figure 11:
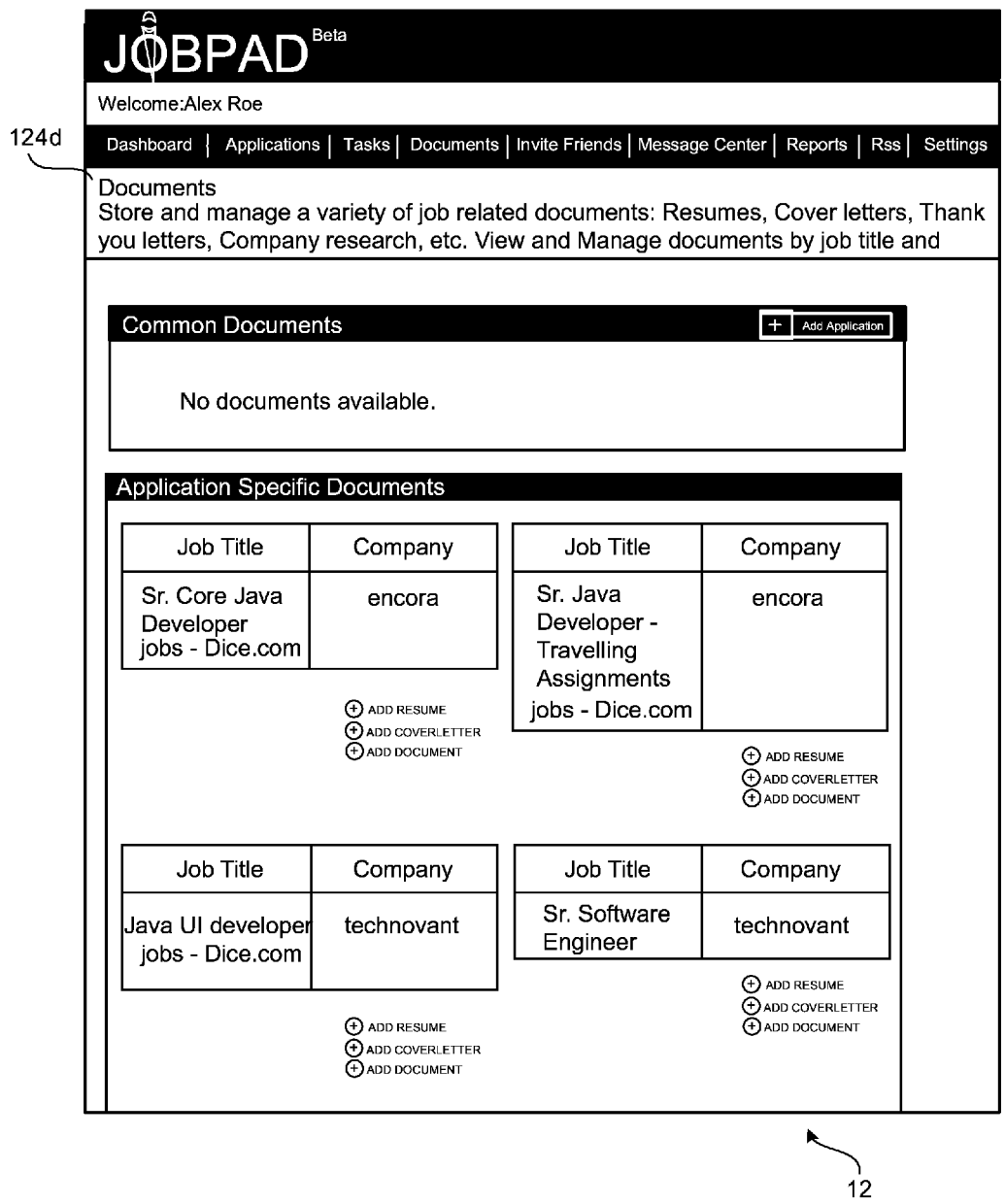
FIG. 11 is a view of the document storage. The user is able directly store their job application related documents into a common documents folder or store the document to be specific to a specific job position.

The organization application programming interface system provides full user interface for full management of stored jobs application details. The organization application programming interface system further provides the user means to modify existing job application details for the plurality of job sites stored in the application database. The organization application programming interface additionally provides an analytic application for calculation of the application statistics. These statistics can include the number of applications submitted, the number of responses, number of applicants for specific job openings, and other important statistics that can help the user adjust their job seeking strategy. The organization application programming interface system can be implemented using standard web technologies including HTML, XML, PHP and java. The organizational application programming interface system can additionally provide the users with means to synchronize their job application details from the plurality of jobs sites to the application database. The organization application programming interface system further comprises of a job application tracker 124a, a document association tracker 124b, a task list 124c, a document storage 124d, a goals manager 124e, a job application log 124f, and a job posting list 124g. Each of the tools provided by the organization application programming interface system allows the user to efficiently manage their job searching and application process. The job application tracker provides the user with means to track the progress and status of each of their job applications, as shown in FIG. 2-3. Due to having several job applications in process, each of the applications may be in different stages. In reference to FIG. 2, the job application tracker can tell the user whether a specific job application is waiting for a reply or if the application requires their action of sending a cover letter or a thank you letter. In reference to FIG. 6, the job application tracker also allows the user to edit the details of a job application. Through the job application tracker, the user can modify job title, the company name, job ID, job compensation, posting dates, location, application date, job description, and job contact information. Additionally, the job application tracker provides the user with means to take notes for each interaction associated with the specified job application. These notes help the user to remember the history of the job application to ensure that the user is always prepared for any necessary interaction with any hiring managers for the specific job application. In reference to FIG. 5, the document associate tracker is an important tool for the job seeking user. For each job application the user may have a different customized resume or cover letter. The document association tracker provides the user with means to link related documents to a specific job application. By being able to link specific documents to specific job applications, the user is able to ensure consistency. The linking of documents can prevent the user from discussing points from another resume to an employer that has a different resume and prevent negative impressions. In reference to FIG. 11, the document storage provided for the user is allows users to store all documents relating to all the job applications in a single place without being misplaced or being lost. In reference to FIG. 2 and FIG. 6, the task list provides the user with means to create a task list of immediate tasks to be accomplished. The task list will allow users to set a date to accomplish a certain task. These tasks can include following up with employers or simply sending in a requested document. In addition to the task list, the goal manager provides the user with the means to set goals to accomplish within a predetermined time period. In reference to FIG. 2, the goals managers help the user to ensure that they are efficiently seeking for their jobs. The user is able to set a deadline for each goal and specify the goals that they are to accomplish. In reference to FIG. 6, the job application log provides the user with the means to log significant events for each job application. The job application log can help the user understand how they proceeded with a job application and how they resulted. This can help the user strategize on future job applications for the best chance of landing a job. Lastly, the organization application programming interface system provides the user with a job posting list that is able to retrieve job postings from each of the jobs sites of the plurality of job sites, as shown in FIG. 7. The job posting list is able to compile the job postings from each of the job sites of the plurality of job sites by means of RSS feeds. Rather than having to access each of the job sites of the plurality of job sites, the user can simply access the job posting list to see all of the job openings available. The job posting list is populated using RSS feeds customized by the user. The user is able to access the plurality of jobsites to make specific job title searches and create an RSS feed to directly post job openings to the job posting list of the present invention. The user can customize a plurality of RSS feeds from the plurality of jobsites.

The purpose of application programming interface is to act as a connector for exchange of data between app management database and any information providing or consuming devices not limited to computers, software, handheld devices etc.

Figure 15:
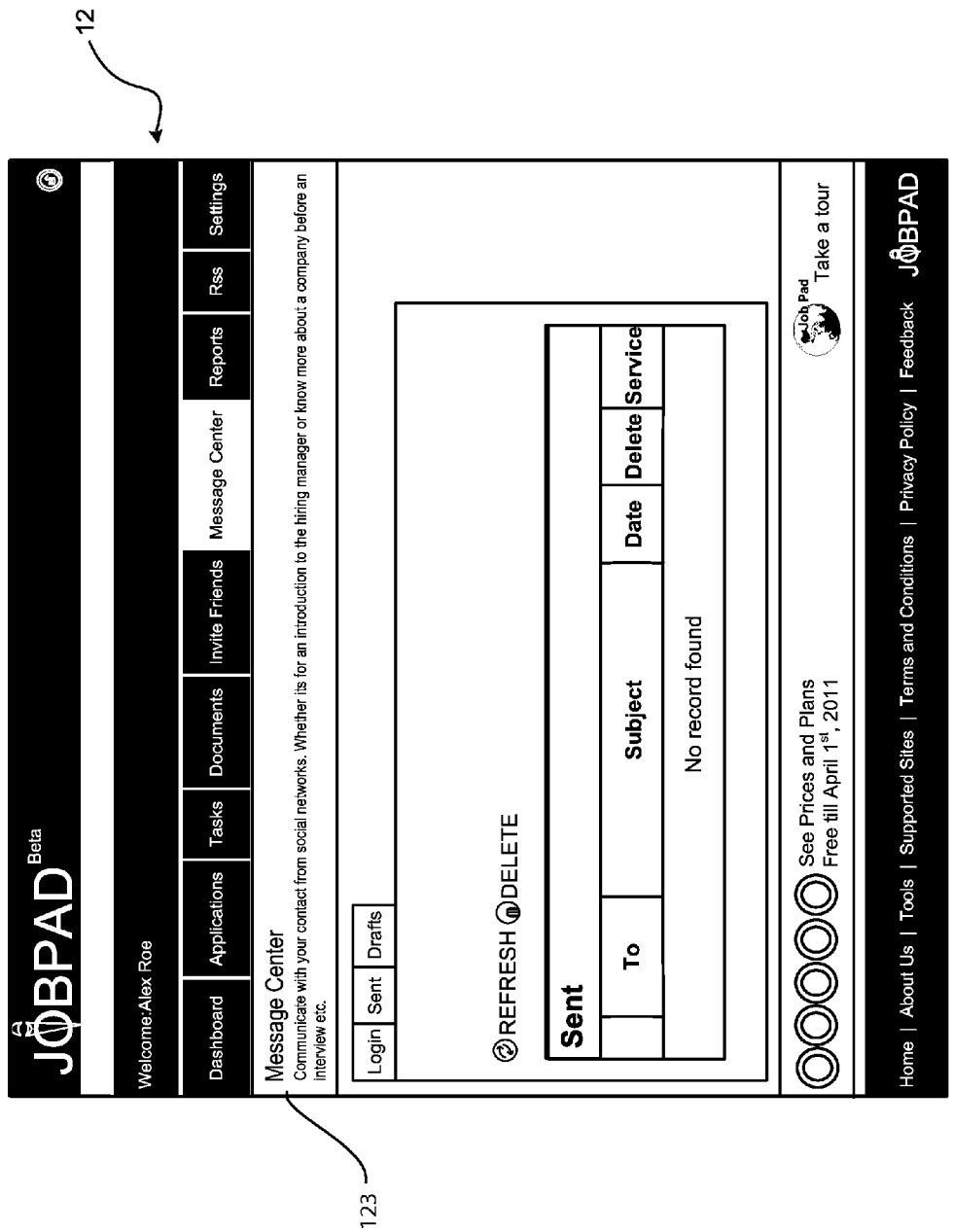
FIG. 15 is a view of the message system, where the user is able to expand their network.

The job application management system also includes capability to automatically detect people from job seeker's social network who work at a specific company and send a message to them related to the job application or search through the message system as shown in FIG. 15.

Figure 10:
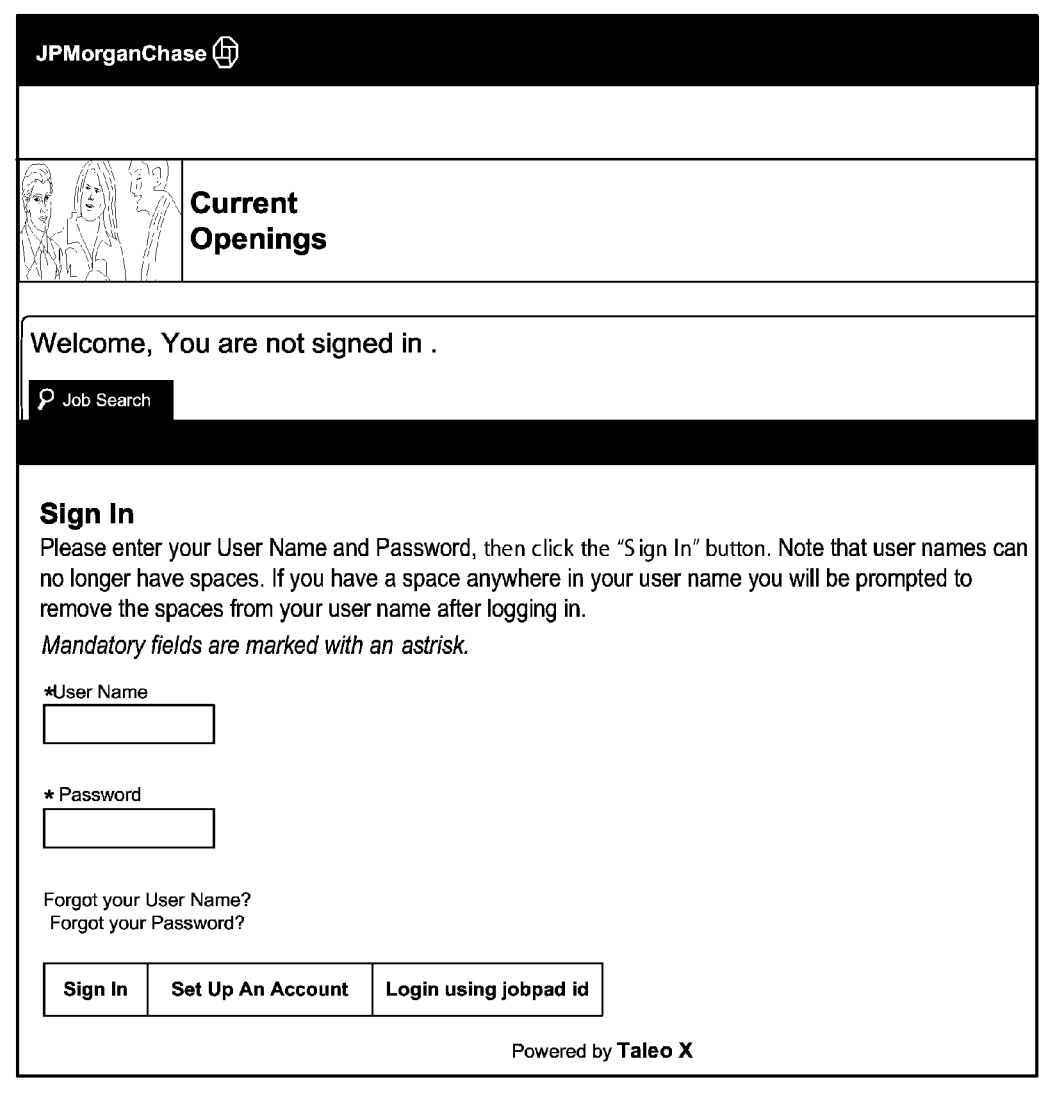
Figure 14:
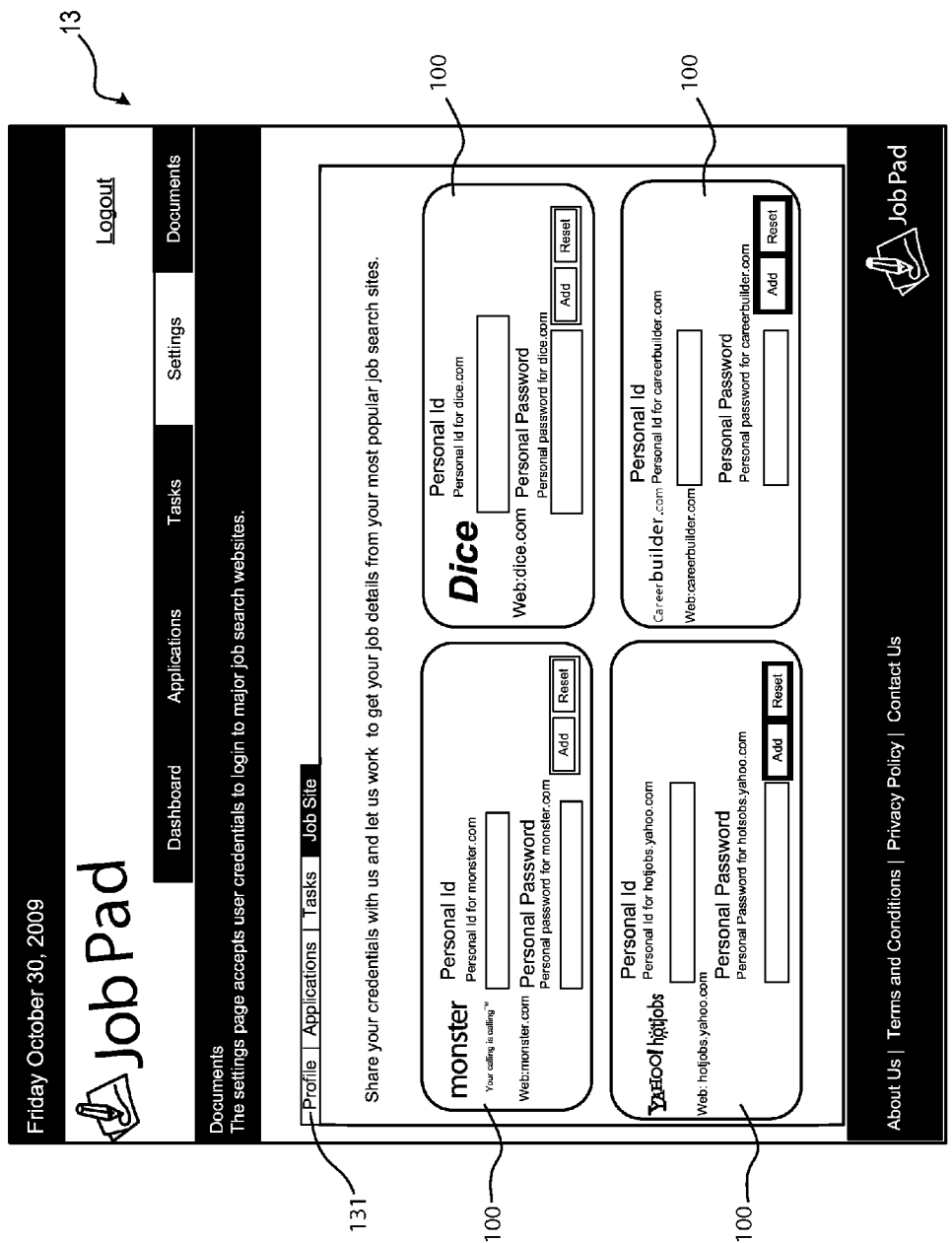
FIG. 14 is a view of the profile management interface. The user is able to access the profile management interface to provide or edit available credentials for the plurality of job sites.

The profile management interface is the portion of the present invention that provides the user the ability to access the plurality of jobsites. Additionally, the profile management interface provides the user accessibility and management of all of the background information. The profile management interface further comprises of a profile HTTP interface system 133, a profile application programming interface 131 and a profile browser extension system 132. The profile application programming interface provides the user with means to create at least one profile with their background information. The background information that the user can input to each of their profiles include their home address, phone number, past experiences, skills, interests, and other information that tell employers about themselves. The background information that the user provides is stored in the profile database. The user are able to use the main credentials they were provided on the welcome page to access the plurality of job sites without needing to create new job profiles on the plurality of job sites through the profile application programming interface, as shown in FIG. 10. If the users already have credentials they did not provide in the welcome page to any of the preferred plurality of jobsites, they are able to input the credentials in the profile management interface, as shown in FIG. 14. By utilizing this technology, Jobseekers will be able to login to any profile requesting website and submit their profile using their main user credentials. The profile application programming interface additionally is able to provide the plurality of jobsites with background information to be automatically filled out on a job application form. The profile browser extension system, like the application browser extension system, is a web browser integrated system. The profile browser extension system provides the user with manual synchronization of the at least one profile with the plurality of job sites. The profile browser extension system is able to parse and recognize required fields on job applications forms provided by the plurality of job sites. By parsing and recognizing each field, the profile browser extension system is able to fill out the required information for the job application provided by the job sites that are not compatible with the job application management system.

In addition, this invention provides an application programming interface (API) to manage profiles. The purpose of this application programming interface is to act as a connector for exchange of data between the application management database and any information providing or consuming devices not limited to computers, software, handheld devices etc. Using these APIs, job seeker's profile(s) will be captured automatically from any profile(s) provider. Also these APIs, will provide an interface to transmit profile(s) to any profile consuming device or application.

With this profile management system/interfaces, job seekers will be able to automate and reduce time/effort on many tasks including but not limited to job application submission, profile creation etc.

Although the invention has been explained in relation to its preferred embodiment, it is to be understood that many other possible modifications and variations can be made without departing from the spirit and scope of the invention as hereinafter claimed.

What is claimed is:

1. A non-transitory computer-readable medium storing a plurality of instructions which when executed by one or more processors causes the one or more processors to perform a method for assisting and managing a job application, the plurality of instructions comprising:
   instructions for providing a job application management system;
   instructions for providing a job application management server;
   instructions for operating of the job application management system on the job application management server;
   instructions for providing a welcome page, an application management interface and a profile management interface by the job application management system;
   instructions for providing a HTTP interface system, an application browser extension system, a message system, and an organization application programming interface system by the application management interface;
   instructions for providing a profile HTTP interface system, a profile application programming interface and a profile browser extension system by the profile management interface;
   instructions for providing a job application management database by the job application management server;
   instructions for providing an application database and a profile database by the job application management database;
   wherein the application browser extension system and the profile browser extension system is an add on extension interfaces for a web browser;
   instructions for providing users with ability to provide credentials of a plurality of job sites by the welcome page;
   wherein the provided credentials grants the job application management system access to the plurality of job sites;
   instructions for providing main credentials by the welcome page for accessing the job application management system;
   instructions for providing uploading means by the welcome page for profile documentation to be stored into the profile database, wherein the profile documentation includes customized resumes, cover letters, follow-up letters, and other job application related documents;
   instructions for providing organization and management means by the application management interface for job applications, associated resumes, cover letters, tasks lists, and application logs;
   instructions for retrieving job application information from the plurality of job sites by the HTTP interface system;
   instructions for providing convenient access by the application browser extension system to the job application management system for synchronization with the plurality of job sites;
   instructions for providing management of messages relating to job applications by the message system;
   instructions for providing full management of job application information by the organization application programming interface system;
   instructions for providing profile management for information capture and exchange by the profile management interface;

instructions for eliminating the need to create job profiles for a plurality of job sites by the profile management interface;

instructions for providing full management of at least one profile by the profile application programming interface;

instructions for providing convenient manual access to the at least one profile for synchronization with the plurality of jobsites by the profile browser extension system; and instructions for implementing of the job application management system by interfaces selected from the group consisting of a desktop computer application, a mobile handheld application, browser web based application, and widget applications.

2. The non-transitory computer-readable medium of claim 1, the plurality of instructions further comprising:

instructions for making web service calls to the plurality of job sites by the HTTP interface system, wherein the web service calls being HTTP requests to interact with each of the plurality of job sites using the provided credentials from the welcome page;

wherein the HTTP interface system being able to login to the plurality of job sites with the provided credentials from the welcome page;

wherein the HTTP interface system utilizes web services and technologies including PHP, java and XML to extract and retrieve job application data corresponding with each of the jobsites of the plurality of jobsites in XML format; and instructions for storing of the retrieved job application data into the application database.

3. The non-transitory computer-readable medium of claim 1, the plurality of instructions further comprising:

instructions for providing ease of access to stored documentation in the profile database by the application browser extension system;

instructions for parsing job application websites and extracting job application details by the application browser extension;

instructions for storing of job application details into the application database;

instructions for transmitting extracted job application details into the application database via a network connection transfer; and instructions for analyzing, capturing and exchanging job application data and profile data by the application browser extension.

4. The non-transitory computer-readable medium of claim 1, the plurality of instructions further comprising:

instructions for providing a mailbox to forward job application related emails to the job application management system by the message system;

instructions for storing of the job application related message into the application database;

instructions for parsing of the job application related emails for extraction of job application details; and instructions for sending confirmation email of receipt by the message system.

5. The non-transitory computer-readable medium of claim 1, the plurality of instructions further comprising:

instructions for providing full user interface for full management of stored job application details by the organization application programming interface system;

instructions for providing means to modify the existing job application details for the plurality of job sites stored in the application database by the organization application programming interface;

instructions for providing an analytic application for calculation of application statistics by the organization application programming interface;

instructions for implementing the organization application programming interface using standard web technologies including HTML, XML, PHP, and Java; and instructions for providing means to manually synchronize job application details from the plurality of job sites to the application database by the organization application programming interface.

6. The non-transitory computer-readable medium of claim 1, the plurality of instructions further comprising:

instructions for the profile application programming interface providing means to create at least one profile with background information;

instructions for using the main credential provided to access the plurality of job sites without creating new job profiles corresponding to each of the plurality of job sites; and instructions for the plurality of job sites requesting for the back ground information to automatically fill job application forms with corresponding requested information.

7. The non-transitory computer-readable medium of claim 1, the plurality of instructions further comprising:

instructions for activating the profile browser extension system parsing and recognizing required fields on job application form provided by the plurality of job site; and instructions for filling out the required information automatically for the job application form provided by the plurality of job sites that are incompatible for automatic synchronization with the job application management system by the profile browser extension system.

8. The non-transitory computer-readable medium of claim 5, the plurality of instructions further comprising:

instructions for providing a job application tracker, a document association tracker, a task list, a document storage, a goals manager, a job application log, and a job posting list by the organization application programming interface system;

instructions for providing means to track the progress or status of job applications by the job application tracker;

instructions for providing means to link related documents to a specific job application by the document association tracker;

instructions for providing means to create a task list of immediate tasks to accomplish by the task list;

instructions for providing means to store all related documents for all job applications including customized resumes, cover letters, job descriptions, and thank you letters into the job application management database by the document storage;

instructions for providing means to set goals to accomplish within a predetermined time period by the goals manager;

instructions for providing means to log significant events for each job application by the job application log; and instructions for retrieving job postings from each of the job sites of the plurality of job sites, via RSS feeds, by to the job posting list.

* * * * *